United States Patent
Shin

(10) Patent No.: US 11,868,912 B2
(45) Date of Patent: Jan. 9, 2024

(54) MULTI-DEVICE BASED INFERENCE METHOD AND APPARATUS

(71) Applicant: Samsung Electronics Co., Ltd., Suwon-si (KR)

(72) Inventor: Sanggyu Shin, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 626 days.

(21) Appl. No.: 17/019,973

(22) Filed: Sep. 14, 2020

(65) Prior Publication Data

US 2021/0248501 A1    Aug. 12, 2021

(30) Foreign Application Priority Data

Feb. 6, 2020   (KR) .................. 10-2020-0014180

(51) Int. Cl.
  *G06N 3/02* (2006.01)
  *G06N 5/04* (2023.01)
  *G06F 8/41* (2018.01)
  *G06F 16/901* (2019.01)

(52) U.S. Cl.
  CPC ............ *G06N 5/042* (2013.01); *G06F 8/456* (2013.01); *G06F 16/9024* (2019.01); *G06N 3/02* (2013.01)

(58) Field of Classification Search
  None
  See application file for complete search history.

(56) References Cited

U.S. PATENT DOCUMENTS

2018/0136912 A1   5/2018   Venkataramani et al.

FOREIGN PATENT DOCUMENTS

| CN | 110189260 A | 8/2019 |
|---|---|---|
| JP | 4884297 B2 | 2/2012 |
| JP | 6718119 B2 | 7/2020 |
| WO | WO 2019/079025 A1 | 4/2019 |

OTHER PUBLICATIONS

Narayanan et al ("PipeDream: Generalized Pipeline Parallelism for DNN Training" 2019) (Year: 2019).*
Wang ("Parallel Training via Computation Graph Transformation" 2019) (Year: 2019).*
Jia, Zhihao et al., "Exploring Hidden Dimensions in Parallelizing Convolutional Neural Networks", arXiv preprint arXiv:1802.04924, Jun. 9, 2018 (pp. 1-11).
(Continued)

*Primary Examiner* — Lut Wong
(74) *Attorney, Agent, or Firm* — NSIP Law

(57) ABSTRACT

Disclosed is a multi-device based inference method and apparatus, where the multi-device based inference method includes receiving information related to operation devices performing an operation included in a neural network and a graph corresponding to the neural network, obtaining a size of an output of the operation in a forward direction of the graph based on the information and the graph, dividing an input of the operation in a backward direction of the graph based on the information, the graph, and the size of the output, and performing an inference based on the divided input.

21 Claims, 7 Drawing Sheets

(56) References Cited

OTHER PUBLICATIONS

Chen, Tianqi et al., "TVM: An Automated End-to-End Optimizing Compiler for Deep Learning", *Proceedings of the 13th USENIX Symposium on Operating Systems Design and Implementation (OSDI '18)*, Carlsbad, California, United States of America, Oct. 8-10, 2018 (pp. 1-17).
Mesa., "Concept of Deep Learning for Autonomous Driving (2)", *Naver*, Feb. 15, 2019 (4 pages in English and 9 pages in Korean).
Manipatruni, Jaisimha., "Deep Learning Compiler Architecture", *General Architecture of Deep Learning Customised Compiler Stack*, May 27, 2019 (3 pages in English).
Jia, Zhihao et al., "Beyond Data and Model Parallelism for Deep Neural Networks", *SysML'2019*, Jun. 12, 2019 (pp. 1-13).

\* cited by examiner

```
Algorithm 1 Forward Pass
 1: Input: An operator graph G, a device type D
 2: for node = G.first to G.last do
 3:     Calculate the size of out-feature map
 4:     node.ofm_size = ofm_size
 5:     if D type is first or node operator type is first then
 6:         Estimate the process time by dividing it into B, C, H, W  // to find best dim
 7:         Write this on disk
 8: return G
```

FIG. 4

```
Algorithm 2 Backward Pass
 1: Input: An operator graph G, a device type D, a device topology T
 2: splitGraph = {}  // a operator graph split by execution time and transfer time
 3: for node = G.last to G.first do
 4:     executionCost = executionTime(node, D)
 5:     transferCost = transferTime(node, T, splitGraph)
 6:     if originalCost > executionCost + transferCost then
 7:         splitGraph.add(split(node))  // Split this layer and add them into splitGraph
 8:     else
 9:         splitGraph.add(node)
10: return splitGraph
```

FIG. 5

MULTI-DEVICE BASED INFERENCE METHOD AND APPARATUS

CROSS-REFERENCE TO RELATED APPLICATIONS

This application claims the benefit under 35 USC § 119(a) of Korean Patent Application No. 10-2020-0014180 filed on Feb. 6, 2020 in the Korean Intellectual Property Office, the entire disclosure of which is incorporated herein by reference for all purposes.

BACKGROUND

1. Field

The following description relates to a multi-device based inference method and apparatus.

2. Description of Related Art

The conventional deep learning compilers may lack various multi-device parallelism strategies. The existing deep learning compilers principally support the parallel performance on a single device. Even though the conventional deep learning compilers may support multi-device parallelism, only batch-based data parallelism that is commonly used or model parallelism that divides and batches layers of a model is used.

Latency is evaluated as the most important factor in an inference environment. If the inference is processed in real time or performed using fewer batches for latency, the batches may be assigned variably, rather than being fixed. If the simple batch-based data parallelism is applied to an environment where batches are assigned variably, the dependency on the batches increases, and not all available devices may be utilized.

On the other hand, since the height and the width of a feature map are fixed values of a model network structure regardless of the arrangement, they are likely to be used in the inference environment.

Also, various conventional intra-layer parallelisms are generally implemented offline. In many examples regarding data dimension-based layer parallelism or intra-layer parallelism, a simulator or module that finds the optimal strategy in a large search space is often configured offline, and this method is rather difficult to apply to a deep learning compiler structure in which a real-time reaction is important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a multi-device based inference method, including receiving information related to operation devices performing an operation included in a neural network and a graph corresponding to the neural network, obtaining a size of an output of the operation in a forward direction of the graph based on the information and the graph, dividing an input of the operation in a backward direction of the graph based on the information, the graph, and the size of the output, and performing an inference based on the divided input.

The obtaining may include storing, in a node included in the graph, a size of an output of the operation corresponding to the node in the forward direction of the graph.

The multi-device based inference method may include obtaining an operation time based on the information, the size of the output, and a division form of the input of the operation.

The obtaining of the operation time may include determining whether the operation devices are being analyzed for the first time, determining whether the operation is of a type to be analyzed for the first time, and obtaining the operation time based on a result of the determining with respect to the operation devices, a result of the determining with respect to the operation, and the size of the output.

The obtaining of the operation time based on the result of the determining with respect to the operation devices, the result of the determining with respect to the operation, and the size of the output may include obtaining the operation time based on the size of the output and the division form, in response to the operation devices being analyzed for the first time, or the operation being analyzed for the first time.

The division form may include any one or any combination of a batch division, a channel division, a height division, and a width division.

The dividing may include with respect to each node in a direction from an output node to an input node of the graph, dividing the input of the operation based on an operation time obtained depending on whether an input for the each node is divided.

The dividing of the input of the operation based on the operation time obtained depending on whether the input for the node is divided may include obtaining a non-division operation time according to the operation devices in response to the input for the node not being divided, obtaining a division operation time according to the operation devices in response to the input for the node being divided, obtaining a transmission cost according to a topology of the operation devices in response to the input for the node being divided, and dividing the input of the operation based on the non-division operation time, the division operation time, and the transmission cost.

The dividing of the input of the operation based on the non-division operation time, the division operation time, and the transmission cost may include dividing the input of the operation if the non-division operation time is greater than the sum of the division operation time and the transmission cost.

The dividing may include dividing the input of the operation by dividing any one or any combination of a batch, a channel, a height, and a width of the input.

In another general aspect, there is provided a multi-device based inference apparatus, including a receiver configured to receive information related to operation devices performing an operation included in a neural network and a graph corresponding to the neural network, and a processor configured to obtain a size of an output of the operation in a forward direction of the graph based on the information and the graph, divide an input of the operation in a backward direction of the graph based on the information, the graph, and the size of the output, and perform an inference based on the divided input.

The processor may be configured to store, in a node included in the graph, a size of an output of the operation corresponding to the node in the forward direction of the graph.

The processor may be configured to obtain an operation time based on the information, the size of the output, and a division form of the input of the operation.

The processor may be configured to determine whether the operation devices are being analyzed for the first time, determine whether the operation is of a type to be analyzed for the first time, and obtain the operation time based on a result of the determining with respect to the operation devices, a result of the determining with respect to the operation, and the size of the output.

The processor may be configured to obtain the operation time based on the size of the output and the division form, in response to the operation devices being analyzed for the first time, or the operation being analyzed for the first time.

The division form may include any one or any combination of a batch division, a channel division, a height division, and a width division.

The processor may be configured to with respect to each node in a direction from an output node to an input node of the graph, divide the input of the operation based on an operation time obtained depending on whether an input for the each node is divided.

The processor may be configured to obtain a non-division operation time according to the operation devices in response to the input for the node not being divided, obtain a division operation time according to the operation devices in response to the input for the node being divided, obtain a transmission cost according to a topology of the operation devices in response to the input for the node being divided, and divide the input of the operation based on the non-division operation time, the division operation time, and the transmission cost.

The processor may be configured to divide the input of the operation if the non-division operation time is greater than the sum of the division operation time and the transmission cost.

The processor may be configured to divide the input of the operation by dividing any one or any combination of a batch, a channel, a height, and a width of the input.

Other features and aspects will be apparent from the following detailed description, the drawings, and the claims.

BRIEF DESCRIPTION OF THE DRAWINGS

FIG. 4 illustrates an example of an algorithm performed in a forward pass by a parallel manager shown in FIG. 2.

FIG. 5 illustrates an example of an algorithm performed in a backward pass by the parallel manager shown in FIG. 2.

Figure 1:
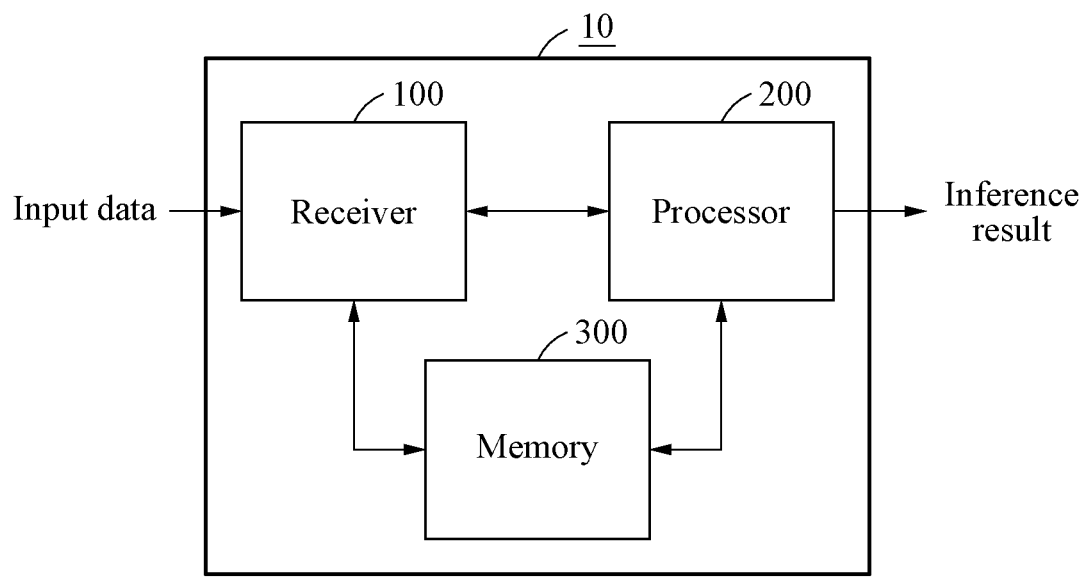
FIG. 1 is a diagram illustrating an example of a multi-device based inference apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

FIG. 1 is a diagram illustrating an example of a multi-device based inference apparatus.

Referring to FIG. 1, a multi-device based inference apparatus 10 generates an inference result by processing input data (or an input). In an example, the multi-device based inference apparatus 10 generates the inference result using a neural network. The input data includes an image, a character, a number, and a sound. Further, the input data includes a neural network model.

The multi-device based inference apparatus 10 performs a neural network operation using a plurality of operation devices. The multi-device based inference apparatus 10 improves an inference rate by distributing the operation of the neural network to plurality of operation devices.

The neural network refers to a general model that has an ability to solve a problem, the model including artificial neurons (nodes) that form a network through synaptic combinations and change a connection strength of the synapses through training. In an example, the neural network may correspond to a recurrent neural network (RNN) or a convolutional neural network (CNN). In an example, the CNN may be a deep neural network (DNN). In an example, the DNN may include a region proposal network (RPN), a classification network, a reinforcement learning network, a fully-connected network (FCN), a deep convolutional network (DCN), a long-short term memory (LSTM) network, and a grated recurrent units (GRUs).

The neural network includes a Convolutional Neural Network (CNN), a Recurrent Neural Network (RNN), a perceptron, a Feed Forward (FF), a Radial Basis Network (RBF), a Deep Feed Forward (DFF), an Auto Encoder (AE), a Variational Auto Encoder (VAE), a Denoising Auto Encoder (DAE), a Sparse Auto Encoder (SAE), a Markov Chain (MC), a Hopfield Network (HN), a Boltzmann Machine (BM), a Restricted Boltzmann Machine (RBM), a Depp Belief Network (DBN), a Deep Convolutional Network (DCN), a Deconvolutional Network (DN), a Deep Convolutional Inverse Graphics Network (DCIGN), a Generative Adversarial Network (GAN), a Liquid State Machine (LSM), an Extreme Learning Machine (ELM), an Echo State Network (ESN), a Deep Residual Network (DRN), a Differentiable Neural Computer (DNC), a Neural Turning Machine (NTM), a Capsule Network (CN), a Kohonen Network (KN), and an Attention Network (AN).

The neural network or the DNN may include a plurality of layers. The plurality of layers may include an input layer, at least one hidden layer, and an output layer. In an example, neural network may include a sub-sampling layer, a pooling layer, a fully connected layer, etc., in addition to a convolution layer. The neural network may map input data and output data that have a nonlinear relationship based on deep learning to perform tasks such as, for example, object classification, object recognition, audio or speech recognition, and image recognition.

The neural network may be trained to perform a desired operation by mapping input data and output data that have a nonlinear relationship therebetween through deep learning to perform various tasks. The deep learning is a machine learning method used to solve a problem given from a big dataset. The deep learning may also be construed as a problem-solving process for optimization to find a point where energy is minimized while training the neural network using provided training data. Through deep learning, for example, supervised or unsupervised learning, a weight corresponding to an architecture or a model of the neural network may be obtained, and the input data and the output data may be mapped to each other based on the obtained weight.

In an example, the neural network may be implemented as an architecture having a plurality of layers including an input image, feature maps, and an output. In the neural network, a convolution operation between the input image, and a filter referred to as a kernel, is performed, and as a result of the convolution operation, the feature maps are output. Here, the feature maps that are output may be input feature maps for a subsequent layer, and a convolution operation between the output feature maps and the kernel is performed again, and as a result, new feature maps are output. Based on such repeatedly performed convolution operations, results of recognition of characteristics of the input image via the neural network may be output.

In another example, the neural network may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network.

The multi-device based inference apparatus 10 distributes operations of the neural network and performs the operations in parallel through the plurality of operation devices, thereby improving the inference rate.

The plurality of operation devices include a plurality of processors or a plurality of cores.

The multi-device based inference apparatus 10 uses a deep learning compiler structure including a parallel manager to perform an overall parallel operation through the plurality of operation devices. The deep learning compiler structure will be described in detail with reference to FIG. 2.

The multi-device based inference apparatus 10 operates as a deep learning compiler that applies a parallel operation in view of various dimensions of feature map data in an inference environment where a plurality of operation devices (for example, multiple devices) are used.

The multi-device based inference apparatus 10 improves the inference rate by applying various intra-layer parallelisms in real time even in the multi-device inference environment.

In an example, the multi-device based inference apparatus 10 includes a receiver 100 and a processor 200. The multi-device based inference apparatus 10 further includes a memory 300.

The receiver 100 receives information related to a plurality of operation devices performing an operation included in a neural network and a graph corresponding to the neural network. The receiver 100 receives input data.

For example, the receiver 100 receives information related to an operation type and a connection for the operation and additionally trained parameters.

The information related to the plurality of operation devices includes the number of a plurality of operation devices, types of the plurality of operation devices, performances of the plurality of operation devices, and a topology of the plurality of operation devices.

The topology of the plurality of operation devices includes connection information between the plurality of operation devices configured in a server. For example, the topology of the plurality of operations includes information relating to layers and devices used to connect CPUs, GPUs, and NPUs.

The receiver 100 includes a receiving interface. The receiver 100 outputs the received information related to the plurality of operation devices and the received input data to the processor 200 and/or the memory 300.

The processor 200 processes data stored in the memory 300. The processor 200 executes a computer-readable code (for example, software) stored in the memory 300 and instructions triggered by the processor 200.

The processor 200 is a data processing device implemented by hardware including a circuit having a physical structure to perform desired operations. For example, the desired operations may include instructions or codes included in a program.

For example, the hardware-implemented data processing device includes a microprocessor, a central processing unit (CPU), a processor core, a multi-core processor, a multiprocessor, an application-specific integrated circuit (ASIC), and a field-programmable gate array (FPGA).

The processor 200 generates an inference result by processing the input data based on the information related to the operation devices and the graph. In an example, the input data includes an image.

The processor 200 obtains a size of an output of an operation in a forward direction of the graph corresponding to the neural network based on the information related to the operation devices.

In an example, the size of the output of the operation includes a size of an output feature map of the operation.

The graph related to the operation included in the neural network includes an operation as a node. For example, the node of the graph includes at least one neural network operation.

In an example, the graph refers to a model for a network that is trained through deep learning. In an example, models used in deep learning are expressed by graphs.

In an example, a graph includes nodes and an edge. In an example, the nodes refer to operations used in deep learning, and the edge refers to a dependency and a data flow between the operations.

For example, when expressing a model performing a convolution operation, a rectified linear unit (ReLU) operation, and a fully connected operation using a graph, the convolution operation, the ReLU operation, and the fully connected operation are expressed as nodes, and a connection between the convolution operation and the ReLU operation and a connection between the ReLU operation and the fully connected operation are expressed as edges. The graph further includes trained parameters.

In an example, the graph includes data that diagrams a process of an operation from an input to an output of the neural network using edges that connect nodes.

In an example, the graph includes a layer included in the neural network as a node, and expresses a connection between one layer and another layer as an edge.

In other words, the node of the graph denotes a layer (or an operation corresponding to a layer), and the edge denotes a connection between layers (or an order of layer operations).

A forward direction of the graph refers to a direction from the input toward the output of the graph.

A division form of the input includes any one or any combination of a batch division, a channel division, a height division, and a width division. The processor 200 divides the dimension of the input data and divides a model of the neural network to correspond to the divided dimension.

The processor 200 generates the inference result through the neural network by distributing the divided input data and the divided model of the neural network to the plurality of operation devices.

An operation time with respect to the neural network differs depending on the division form of the input. The processor 200 obtains the optimum operation time with respect to at least one division scheme.

The processor 200 generates the graph using the node corresponding to the operation included in the neural network.

The processor 200 stores, in a node included in the graph, a size of an output of an operation corresponding to the node in the forward direction of the graph.

The processor 200 obtains the operation time according to the division form of the input of the operation in a direction from an input node to an output node of the graph based on the information related to the plurality of operation devices and the graph.

The processor 200 obtains the operation time based on the information related to the plurality of operation devices, the type of the operation, the size of the output of the operation, and the division form of the input of the operation.

In an example, the processor 200 determines whether the plurality of operation devices are operation devices to be analyzed for the first time. The processor 200 determines whether the operation is of a type to be analyzed for the first time.

For example, if the neural network is a CNN, the type of the operation includes a convolution operation, a ReLU operation, a pooling operation, and a fully connected (FC) operation.

The processor 200 obtains the operation time based on a result of the determining with respect to the plurality of operation devices, a result of the determining with respect to the operation, and the size of the output of the operation.

If the plurality of operation devices are operation devices to be analyzed for the first time, or if the operation is of a type to be analyzed for the first time, the processor 200 obtains the operation time based on the size of the output of the operation and the division form.

The processor 200 divides the input of the operation in a backward direction of the graph based on the information related to the operation devices, the graph, and the size of the output of the operation. The processor 200 splits the graph by dividing the input of the operation.

The input of the operation includes an input feature map of the operation. The backward direction of the graph refers to a direction from the output toward the input of the graph.

The processor 200 divides the input of the operation by dividing any one or any combination of a batch, a channel, a height, and a width of the input.

With respect to each node in a direction from the output node to the input node of the graph, the processor 200 divides the input of the operation based on an operation time obtained depending on whether an input for the node is divided.

The processor 200 obtains a non-division operation time according to the plurality of operation devices if the input for the node is not divided. That is, the processor 200 obtains the operation time by measuring an operation time of each of the plurality of operation devices if there is no division.

The processor 200 obtains a division operation time according to the plurality of operation devices if the input for the node is divided.

The processor 200 obtains a transmission cost according to a topology of the plurality of operation devices if the input for the node is divided.

The processor 200 divides the input of the operation based on the non-division operation time, the division operation time, and the transmission cost. The processor 200 divides the input of the operation if the non-division operation time is greater than the sum of the division operation time and the transmission cost.

The non-division operation time being greater than the sum of the division operation time and the transmission cost indicates that the operation time is smaller when the input for the node is divided. Thus, it is possible to improve the operation rate when the input for the node is divided.

A process of obtaining an operation time in a forward direction and a process of division in a backward direction will be described in detail with reference to FIGS. 3 through 6.

The processor 200 performs an inference based on the divided input.

The memory 300 stored instructions (or programs) executable by the processor 200. For example, the instructions include instructions to perform an operation of the processor 200 and/or an operation of each element of the processor 200.

The memory 300 is implemented as a volatile memory device or a non-volatile memory device.

The volatile memory device is implemented as, for example, a dynamic random access memory (DRAM), a static random access memory (SRAM), a thyristor RAM (T-RAM), a zero capacitor RAM (Z-RAM), or a Twin Transistor RAM (TTRAM).

The non-volatile memory device is implemented as, for example, an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
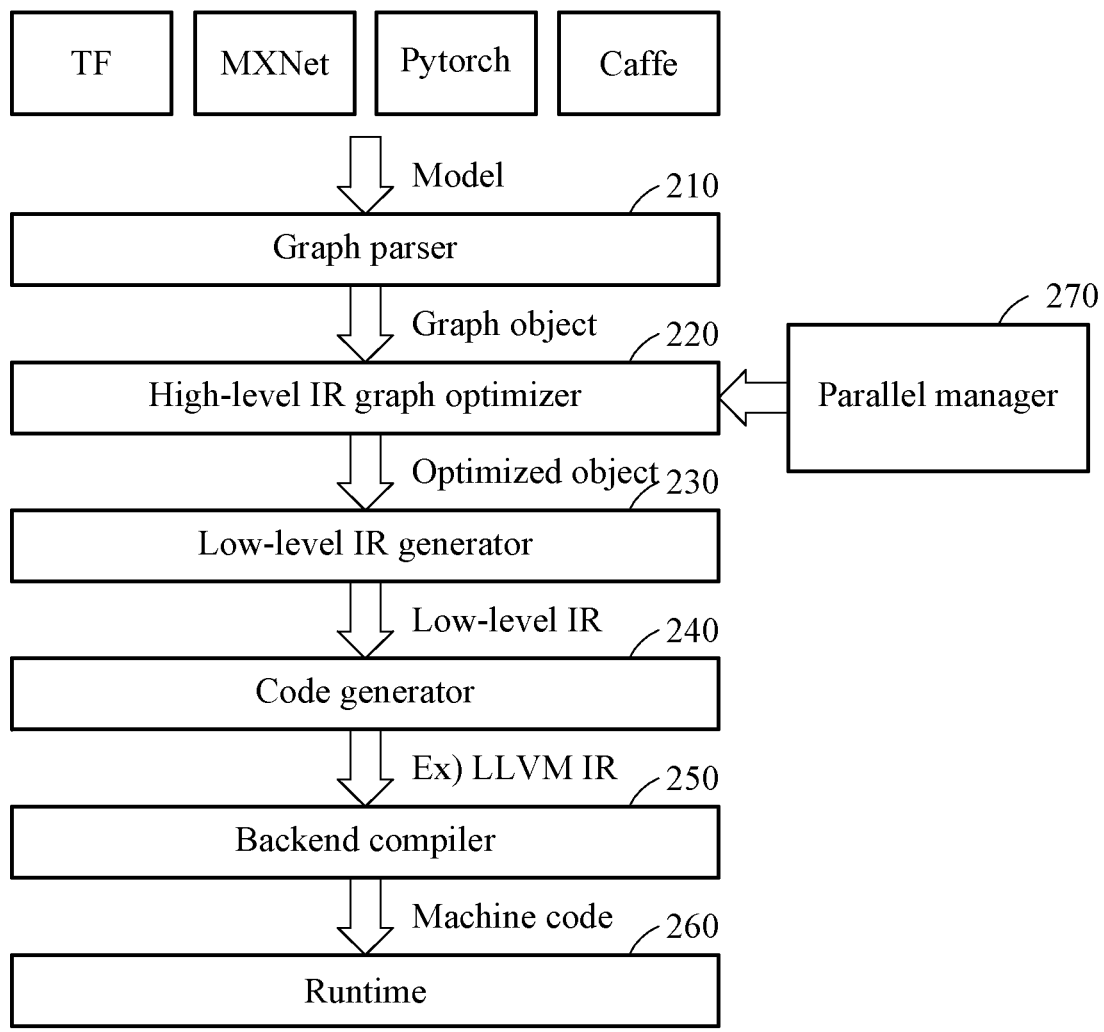
FIG. 2 is a diagram illustrating an example of a processor shown in FIG. 1.

FIG. 2 is a diagram illustrating an example of the processor 200 shown in FIG. 1.

Referring to FIG. 2, the processor 200 includes a graph parser 210, a high-level intermediate representation (IR) graph optimizer 220, a low-level IR generator 230, a code generator 240, a backend compiler 250, a runtime 260, and a parallel manager 270.

The processor 200 serves as a software stack present between a portion written by a user with a high-level language in an open-source deep learning application and devices that perform an actual operation, such as a CPU, a GPU, and an NPU.

The processor 200 establishes a parallel operation policy by adding the parallel manager 270 to the high-level IR graph optimizer 220 to reduce the inference time through a parallel operation.

Tensorflow (TF), MXNet, Pytorch, and Caffe on the top of FIG. 2 are open-source frameworks.

The processor 200 analyzes the graph and translates it into a machine language, such that the performance of an operation device performing the operation is maximized.

The processor 200 extracts model structure and parameter information from a model written with the open-source framework using a model converter and outputs the information to the graph parser 210.

The graph parser 210 parses the model information and outputs the parsed information to the high-level IR graph optimizer 220. The graph parser 210 converts models of various formats generated from an application into a single integrated form.

The high-level IR graph optimizer 220 performs graph optimization such as fusion. The high-level IR graph optimizer 220 performs optimization that is applicable in a high-level IR state. The high-level IR graph optimizer 220 performs optimization independently from hardware.

The low-level IR generator 230 performs a lowering process to generate a low-level IR code based on a high-level IR.

The code generator 240 generates a hardware-specific code. For example, the code generator 240 generates a low-level virtual machine intermediate representation (LLVM IR).

The backend compiler 250 generates a machine language (or machine codes) to be performed by an actual operation device. The runtime 260 executes the generated codes at the operation devices according to an order of the graph. The runtime 260 executes the generated machine language while communicating with the hardware.

The parallel manager 270 generates a parallel operation strategy to perform an optimized parallel operation for each layer of the model of the neural network in view of the topology of the plurality of operation devices. The layer of the neural network model corresponds to at least one neural network operation.

In the example of FIG. 2, the parallel manager 270 is included in the high-level IR graph optimizer 220. In another example, the parallel manager 270 may be included in the low-level IR generator 230, as needed.

An operation of the parallel manager 270 will be described in further details with reference to FIGS. 3 through 6.

Hereinafter, the operation of the parallel manager 270 will be described in detail with reference to FIGS. 3 through 6.

Figure 3:
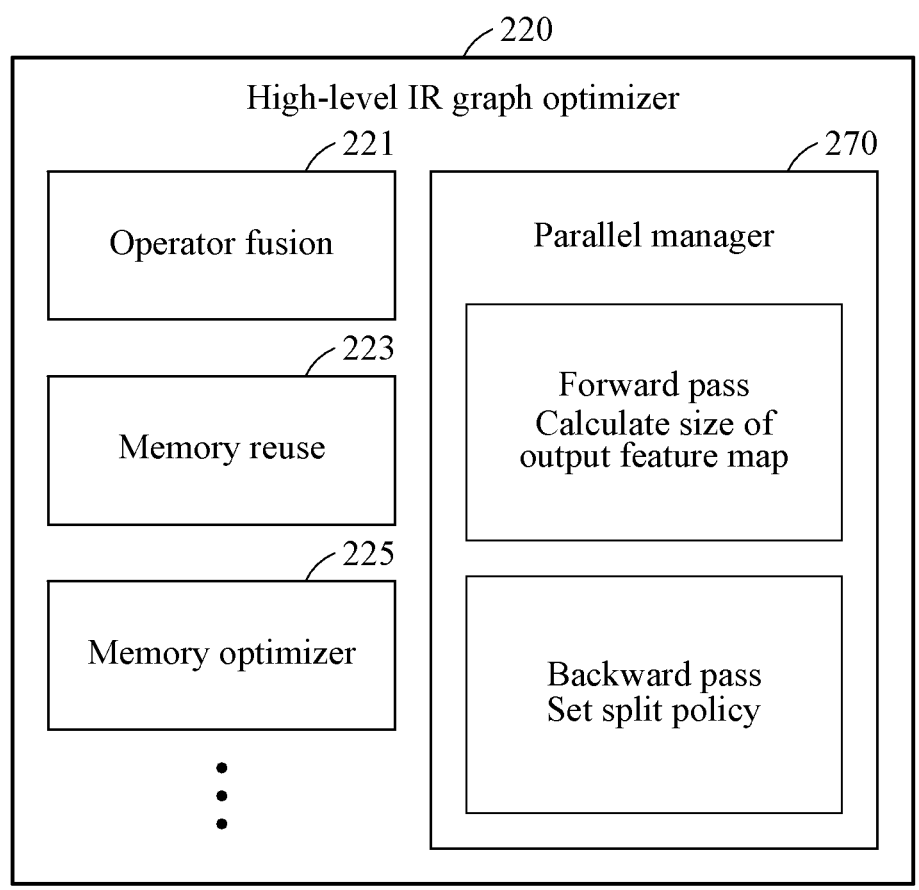
FIG. 3 is a diagram illustrating an example of a high-level intermediate representation (IR) graph optimizer shown in FIG. 2.

FIG. 3 is a diagram illustrating an example of the high-level IR graph optimizer shown in FIG. 2.

Referring to FIG. 3, the high-level IR graph optimizer 220 includes an operator fusion 221, a memory reuse 223, and a memory optimizer 225. The high-level IR graph optimizer 220 selectively includes the parallel manager 270.

Depending on an implementation example, the parallel manager 270 is implemented outside of the high-level IR graph optimizer 220.

The operator fusion 221, the memory reuse 223, and the memory optimizer 225 are configured in the form of modules.

The operator fusion 211 performs optimization with respect to the input graph. The network of the neural network model (for example, DNN model) includes DNN primitive layers such as convolutional layers.

In this example, each layer requires the memory 300 (not shown here) for an input, an output, and a weight. The operator fusion 211 processes output memory areas at the same time by fusing consecutive layers into a single layer in view of the connection form of the graph.

With respect to different memory spaces assigned to layers of the neural network, if there is no need to maintain a previously used memory space any further, the memory reuse 223 allows another layer to use the memory space.

The memory optimizer 225 optimizes the memory space.

The parallel manager 270 generates a parallel operation strategy to distribute the operation of the neural network to the plurality of operation devices using the input graph. The operation of the parallel manager 270 is divided into a forward pass and a backward pass.

The parallel manager 270 sets the parallel operation policy in view of the plurality of operation devices through the forward pass and the backward pass. In an example, the parallel operation policy includes data dimension based layer parallelisms.

For example, the parallel operation policy includes performing the operation by dividing the dimension of the neural network model with respect to any one or any combination of a batch, a channel, a height, and a width.

FIG. 4 illustrates an example of an algorithm performed in a forward pass by the parallel manager shown in FIG. 2, and FIG. 5 illustrates an example of an algorithm performed in a backward pass by the parallel manager shown in FIG. 2.

Figure 6:
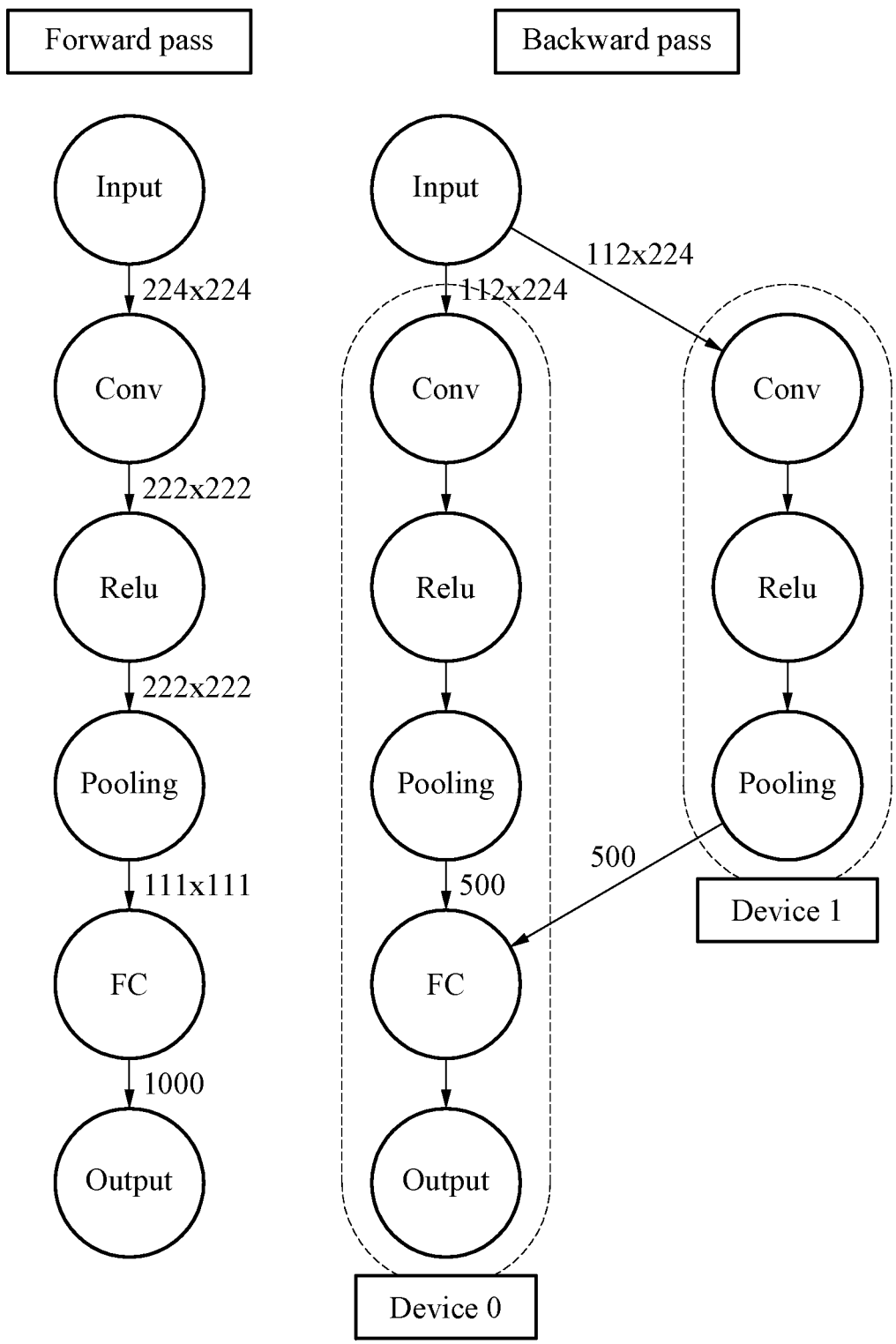
FIG. 6 illustrates an example of operations performed in a forward pass and a backward pass by the parallel manager shown in FIG. 2.
Figure 7:
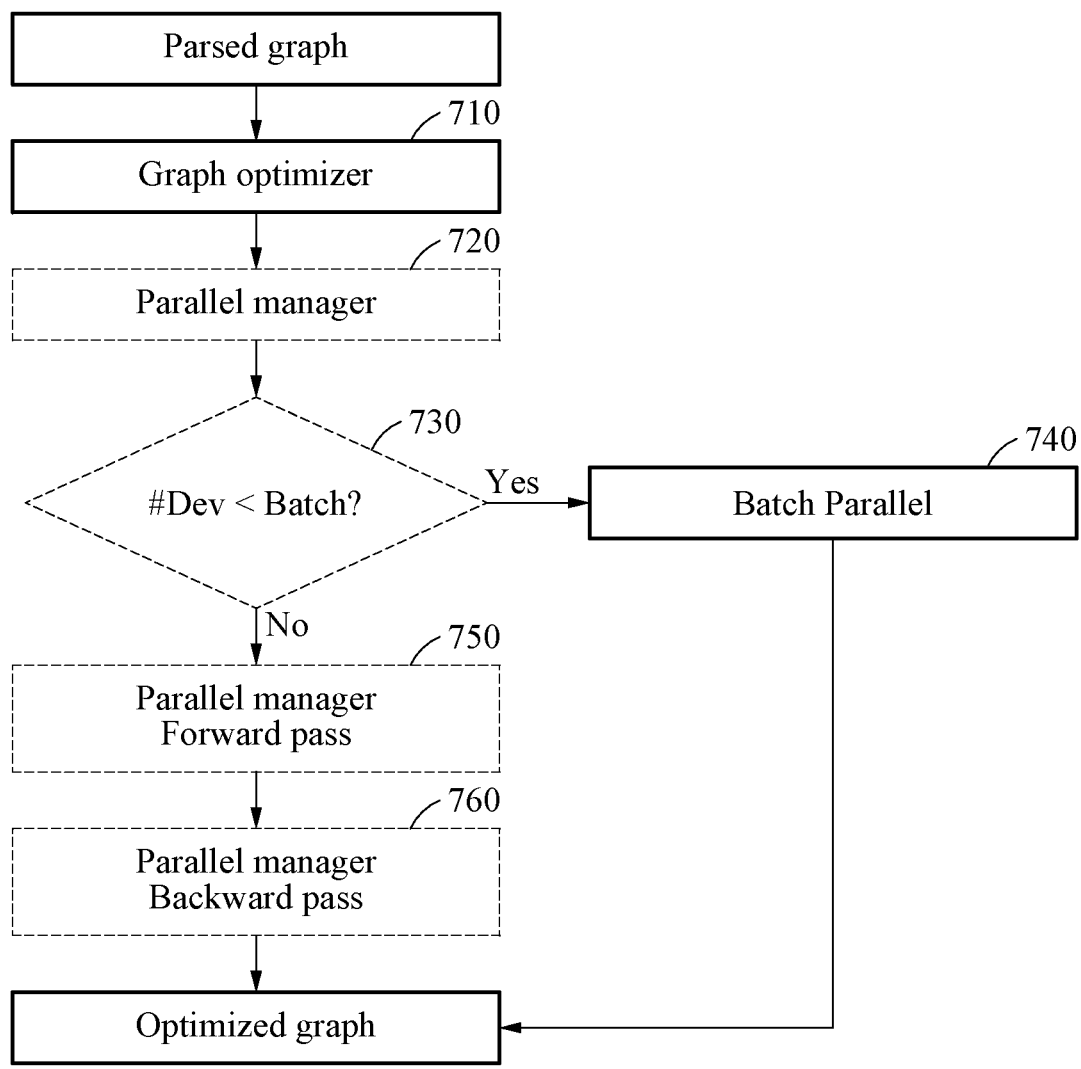
FIG. 7 is a diagram illustrating an example of an operation of the high-level IR graph optimizer shown in FIG. 2.

FIG. 6 illustrates an example of operations performed in a forward pass and a backward pass by the parallel manager shown in FIG. 2, and FIG. 7 is a diagram illustrating an example of performing an operation by dividing an input by the multi-device based inference apparatus of FIG. 1.

Referring to FIGS. 4 through 7, the parallel manager 270 obtains a size of an output of an operation in a forward direction of a graph associated with an operation included in a neural network based on information related to operation devices and the graph.

The parallel manager 270 calculates a size of an output feature map of an operation of each node while going around nodes from an input to an output of the graph and stores the calculated size in the node.

If a neural network is used for the first time, the parallel manager 270 obtains and stores an operation time and an operation quantity required for performance while performing an operation of the actual neural network through a single operation device.

The same measurement is not performed with respect to a neural network of which the operation time and the operation quantity have been measured and obtained once.

The algorithm of FIG. 4 shows an operation corresponding to a forward pass of the parallel manager 270. The parallel manager 270 receives information related to operation devices and a graph.

In the example of FIG. 4, a device type D indicates whether an operation device is an operation device to be used for an operation for the first time.

The parallel manager 270 calculates a size of an output feature map while going around nodes in a direction (or forward direction) from a first node to a last node of the graph.

In the example of FIG. 6, the parallel manager 270 calculates a size of an output feature map of each node while going around nodes from an input to an output. The output feature map is in the form that differs depending on a type of operation of the layer. For example, the output feature map is in a one-dimensional or two-dimensional form.

The parallel manager 270 obtains (or measures) an operation time (or process time) in a direction (or forward direction) from the first node to the last node of the graph, if the operation device is an operation device to be used for the first time or if the operation is of a type to be used for the first time.

In an example, the parallel manager 270 obtains the operation time according to a division form of the input of the operation. For example, the division form includes any one or any combination of a batch division, a channel division, a height division, and a width division.

The parallel manager 270 stores, in the memory 300, a dimension with the most excellent parallelism among division forms.

The parallel manager 270 performs an operation in a backward pass based on a result of performing the forward pass, as shown in FIG. 5. The parallel manager 270 splits the graph by dividing the input of the operation in a backward direction of the graph based on the information related to the plurality of operation devices and the graph.

A search space of the parallel manager 270 includes the graph of the neural network model. The parallel manager 270 establishes a parallel operation policy based on the information related to the operation devices and information obtained as a result of performing the forward pass.

The parallel manager 270 divides, by batch, layers unable to be divided by height or width. For layers unable to be divided by height, width, and batch, the parallel manager 270 uses an integrated layer without dividing the layers. For example, for layers such as FC, Concat, and flatten layers, the parallel manager 270 uses an integrated layer without dividing the layers.

The parallel manager 270 determines two conditions with respect to a layer requiring division.

First, if a layer examined immediately before is determined to be divided, the parallel manager 270 determines whether to maintain the policy having determined the division to minimize communication between operation devices.

Here, determining to maintain the policy indicates that the policy applied to a subsequent layer may be used for a current layer as well. For example, if a pooling layer is determined to be divided by height and a convolutional layer, which is a previous layer, is to be divided by height, the operation of the neural network is performed without additional communication between the plurality of operation devices.

Second, when dividing the current layer, the parallel manager 270 compares an operation time reduced through the division and a data communication cost between the plurality of operation devices incurred due to the division. The parallel manager 270 does not divide the current layer if overhead is greater than when not dividing the current layer, when considering both the communication cost and the operation time reduced by the division.

The parallel manager 270 uses the information related to operation devices and the graph as an input. The information related to the operation devices includes the number of operation devices, operation bandwidths of the operation devices, types of the operation devices, and a topology of the operation devices.

The parallel manager 270 splits the graph in a direction (or backward direction) from the output to the input of the graph. The parallel manager 270 splits the graph based on an operation time obtained depending on whether an input for each node is divided.

The parallel manager 270 obtains a non-division operation time according to the plurality of operation devices if the input for each node is not divided. In the example of the algorithm of FIG. 5, the non-division operation time corresponds to originalCost. For example, the non-division operation time is obtained from the result of performing the forward pass.

The parallel manager 270 obtains a division operation time according to the plurality of operation devices if the input for each node is divided. In the example of the algorithm of FIG. 5, the division operation time corresponds to executionCost.

The parallel manager 270 obtains a transmission cost according to a topology of the plurality of operation devices if the input for each node is divided. In the example of the algorithm of FIG. 5, the transmission cost corresponds to transferCost.

The parallel manager 270 calculates the transmission cost based on an amount of data transmitted between the plurality of operation devices and the bandwidths of the operation devices.

The parallel manager 270 splits the graph based on the non-division operation time, the division operation time, and the transmission cost. In detail, the parallel manager 270 splits the graph if the non-division operation time is greater than the sum of the division operation time and the transmission cost.

The parallel manager 270 uses the graph as is, rather than splitting the graph, if the non-division operation time is less than or equal to the sum of the division operation time and the transmission cost.

The example of FIG. 6 illustrates a case in which the graph is split at a pooling layer. In the example of FIG. 6, the plurality of operation devices includes a device 0 and a device 1. If the size of the entire input is 224×224 (height× width), the device 0 performs convolution, ReLU, and pooling operations with respect to 112×224 having the height divided, and the device 1 performs convolution, ReLU, and pooling operations with respect to a divided, remaining input 112×224.

The device 1 outputs data to the device 0 after the pooling operation, and the device 0 performs operations for FC at a time.

The parallel manager 270 stores information related to the split of the graph in a node divided. The parallel manager 270 outputs a finally generated graph to the low-level IR generator 230. If the parallel manager 270 is implemented in the low-level IR generator 230, the graph is output to the code generator 240.

FIG. 7 is a diagram illustrating an example of an operation of the high-level IR graph optimizer shown in FIG. 2. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-6 are also applicable to FIG. 7, and are incorporated herein by reference. Thus, the above description may not be repeated here.

Referring to FIG. 7, in operation 710, the high-level IR graph optimizer 220 receives a parsed graph and performs optimization thereon using the operator fusion 221, the memory reuse 223, and the memory optimizer 225 as described above.

In operation 720, the parallel manager 270 receives the optimized graph and generates a parallel operation policy. In operation 730, the parallel manager 270 compares the number of operation devices and the number of batches. If the number of operation devices is less than the number of batches, the parallel manager 270 determines Batch Parallel to be the parallel operation policy, in operation 740.

Batch Parallel is an operation scheme that divides an input in the unit of batches and assigns the divided input to the plurality of operation devices.

If the number of operation devices is greater than or equal to the number of batches, the parallel manager 270 performs a forward pass algorithm, in operation 750. The forward pass algorithm is the same as the algorithm described in FIG. 4.

After performing the forward pass algorithm, the parallel manager 270 performs a backward pass algorithm, in operation 760. The backward pass algorithm is the same as the algorithm described in FIG. 5.

The parallel manager 270 outputs a split graph generated through the backward pass algorithm, as an optimized graph.

Figure 8:
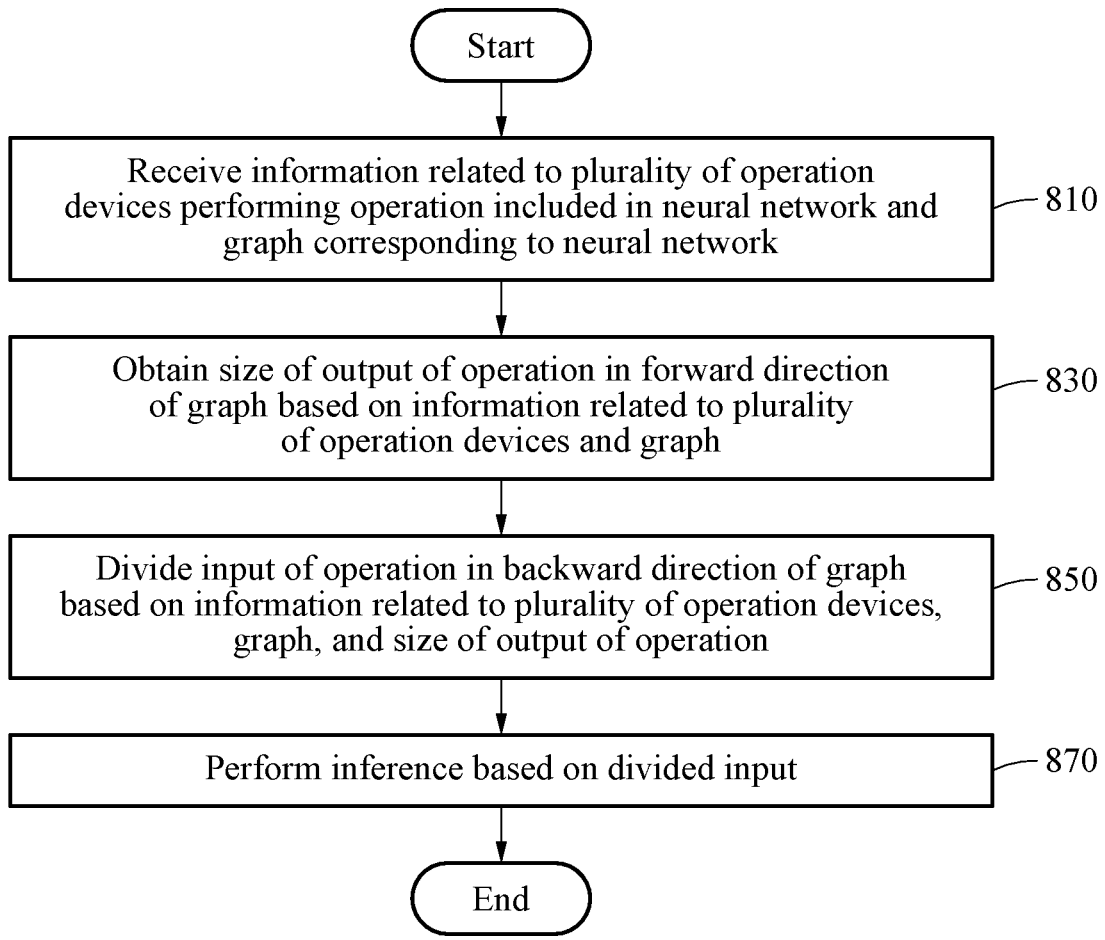
FIG. 8 is a diagram illustrating an example of an operation of the multi-device based inference apparatus of FIG. 1.

FIG. 8 is a diagram illustrating an example of an operation of the multi-device based inference apparatus of FIG. 1. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, the receiver 100 receives information related to a plurality of operation devices performing an operation included in a neural network and a graph corresponding to the neural network.

In operation 830, the processor 220 obtains a size of an output of an operation in a forward direction of the graph based on the information related to the plurality of operation devices and the graph.

The processor 200 stores, in a node included in the graph, a size of an output of an operation corresponding to the node in the forward direction of the graph.

A division form includes any one or any combination of a batch division, a channel division, a height division, and a width division.

The processor 200 obtains the operation time based on the information related to the plurality of operation devices, the type of the operation, the size of the output, and the division form of the input of the operation.

The processor 200 determines whether the plurality of operation devices are operation devices to be analyzed for the first time, and determine whether the operation is of a type to be analyzed for the first time.

The processor 200 obtains the operation time based on a result of the determining with respect to the plurality of operation devices, a result of the determining with respect to the operation, and the size of the output.

If the plurality of operation devices are operation devices to be analyzed for the first time, or if the operation is of a type to be analyzed for the first time, the processor 200 obtains the operation time based on the size of the output and the division form.

In operation 850, the processor 200 divides the input of the operation in a backward direction of the graph based on the information related to the plurality of operation devices and the graph.

With respect to each node in a direction from the output node to the input node of the graph, the processor 200 divides the input of the operation based on an operation time obtained depending on whether an input for the node is divided.

The processor 200 obtains a non-division operation time according to the plurality of operation devices if an input for each node is not divided, and obtains a division operation time according to the plurality of operation devices if the input for each node is divided.

The processor 200 obtains a transmission cost according to a topology of the plurality of operation devices if the input for the node is divided.

The processor 200 divides the input of the operation based on the non-division operation time, the division operation time, and the transmission cost. In detail, the processor 200 divides the input of the operation if the non-division operation time is greater than the sum of the division operation time and the transmission cost.

In this example, the processor 200 divides the input of the operation by dividing any one or any combination of a batch, a channel, a height, and a width of the input.

In operation 870, the processor 200 performs an inference based on the divided input.

The multi-device based inference apparatus 10, receiver 100, graph parser 210, high-level intermediate representation (IR) graph optimizer 220, low-level IR generator 230, code generator 240, backend compiler 250, runtime 260, parallel manager 270, an operator fusion 221, memory reuse 223, memory optimizer 225, and other apparatuses, units, modules, devices, and other components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, central processing unit (CPU), application-specific integrated circuit (ASIC), and field-programmable gate array (FPGA).

The methods illustrated in the figures that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-device based inference method, comprising:
by a processor:
  obtaining, based on a graph corresponding to a neural network and based on information related to operation devices performing an operation included in the neural network, a size of an output of the operation in a forward direction of the graph;
  obtaining an operation time based on the information, the size of the output, and a division form of an input of the operation;
  dividing, based on the graph, the information, the size of the output, and the operation time, the input of the operation in a backward direction of the graph; and
  performing an inference by the neural network based on the divided input.

2. The multi-device based inference method of claim 1, wherein the obtaining comprises:
  storing, in a node included in the graph, a size of an output of the operation corresponding to the node in the forward direction of the graph.

3. The multi-device based inference method of claim 1, wherein the obtaining of the operation time comprises:
  determining whether the operation devices are being analyzed for a first time;
  determining whether the operation is of a type to be analyzed for a first time; and
  obtaining the operation time based on a result of the determining with respect to the operation devices, a result of the determining with respect to the operation, and the size of the output.

4. The multi-device based inference method of claim 3, wherein the obtaining of the operation time based on the result of the determining with respect to the operation devices, the result of the determining with respect to the operation, and the size of the output comprises:
  obtaining the operation time based on the size of the output and the division form, in response to the operation devices being analyzed for the first time, or the operation being analyzed for the first time.

5. The multi-device based inference method of claim 1, wherein the dividing of the input comprises dividing the input in the division form, and
  wherein the division form comprises any one or any combination of a batch division, a channel division, a height division, and a width division.

6. The multi-device based inference method of claim 1, wherein the dividing of the input comprises:
  with respect to each node in a direction from an output node to an input node of the graph,
  dividing the input of the operation based on an obtained operation time of each node, and
  wherein the operation time of each node depends on whether an input for the each node is divided.

7. The multi-device based inference method of claim 6, wherein the dividing of the input of the operation based on the operation time of each node comprises:
  obtaining a non-division operation time according to the operation devices in response to the input for each node not being divided;
  obtaining a division operation time according to the operation devices in response to the input for each node being divided;
  obtaining a transmission cost according to a topology of the operation devices in response to the input for each node being divided; and
  dividing the input of the operation based on the non-division operation time, the division operation time, and the transmission cost.

8. The multi-device based inference method of claim 7, wherein the dividing of the input of the operation based on the non-division operation time, the division operation time, and the transmission cost comprises:
  dividing the input of the operation, in response to the non-division operation time being greater than a sum of the division operation time and the transmission cost.

9. The multi-device based inference method of claim 1, wherein the dividing of the input of the operation comprises:
  dividing the input of the operation by dividing any one or any combination of a batch, a channel, a height, and a width of the input.

10. A non-transitory computer-readable storage medium storing instructions that, when executed by a processor, cause the processor to perform the multi-device based inference method of claim 1.

11. A multi-device based inference apparatus, comprising:
a processor configured to:
  obtain, based on a graph corresponding to a neural network and based on information related to operation devices performing an operation included in the neural network, a size of an output of the operation in a forward direction of the graph;
  obtain an operation time based on the information, the size of the output, and a division form of an input of the operation;
  divide, based on the graph, the information, the size of the output, and the operation time, the input of the operation in a backward direction of the graph; and
  perform an inference based on the divided input.

12. The multi-device based inference apparatus of claim 11, wherein the processor is further configured to:
store, in a node included in the graph, a size of an output corresponding to the node in the forward direction of the graph.

13. The multi-device based inference apparatus of claim 11, wherein the processor is further configured to:
determine whether the operation devices are being analyzed for a first time;
determine whether the operation is of a type to be analyzed for a first time; and
obtain the operation time based on a result of the determining with respect to the operation devices, a result of the determining with respect to the operation, and the size of the output.

14. The multi-device based inference apparatus of claim 13, wherein the processor is further configured to:
obtain the operation time based on the size of the output and the division form, in response to the operation devices being analyzed for the first time, or the operation being analyzed for the first time.

15. The multi-device based inference apparatus of claim 11, wherein the dividing of the input comprises dividing the input in the division form, and
wherein the division form comprises any one or any combination of a batch division, a channel division, a height division, and a width division.

16. The multi-device based inference apparatus of claim 11, wherein the processor is further configured to:
with respect to each node in a direction from an output node to an input node of the graph,
divide the input of the operation based on an obtained operation time of each node, and
wherein the operation time of each node depends on whether an input for each node is divided.

17. The multi-device based inference apparatus of claim 16, wherein the processor is further configured to:
obtain a non-division operation time according to the operation devices in response to the input for each node not being divided;
obtain a division operation time according to the operation devices in response to the input for each node being divided;
obtain a transmission cost according to a topology of the operation devices in response to the input for each node being divided; and
divide the input of the operation based on the non-division operation time, the division operation time, and the transmission cost.

18. The multi-device based inference apparatus of claim 17, wherein the processor is further configured to:
divide the input of the operations in response to the non-division operation time being greater than a sum of the division operation time and the transmission cost.

19. The multi-device based inference apparatus of claim 11, wherein the processor is further configured to:
divide the input of the operation by dividing any one or any combination of a batch, a channel, a height, and a width of the input.

20. The multi-device based inference method of claim 1, further comprising splitting the graph in a direction from the output to the input of the graph based on the operation time, the information, and the size of the output.

21. The multi-device based inference apparatus of claim 11, wherein the processor is further configured to split the graph in a direction from the output to the input of the graph based on the operation time, the information, and the size of the output.

* * * * *